F. B. JACKSON.
LIGHTNING PROTECTIVE ATTACHMENT FOR OIL TANKS AND OTHER STRUCTURES.
APPLICATION FILED AUG. 5, 1915.
1,251,037.
Patented Dec. 25, 1917.
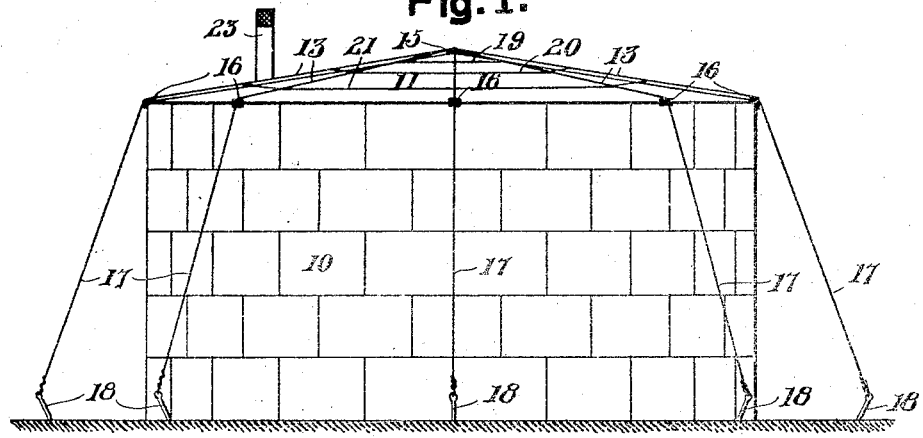
Fig. 1.
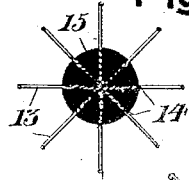
Fig. 3.
Fig. 2.
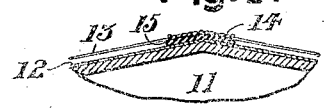
Fig. 4.
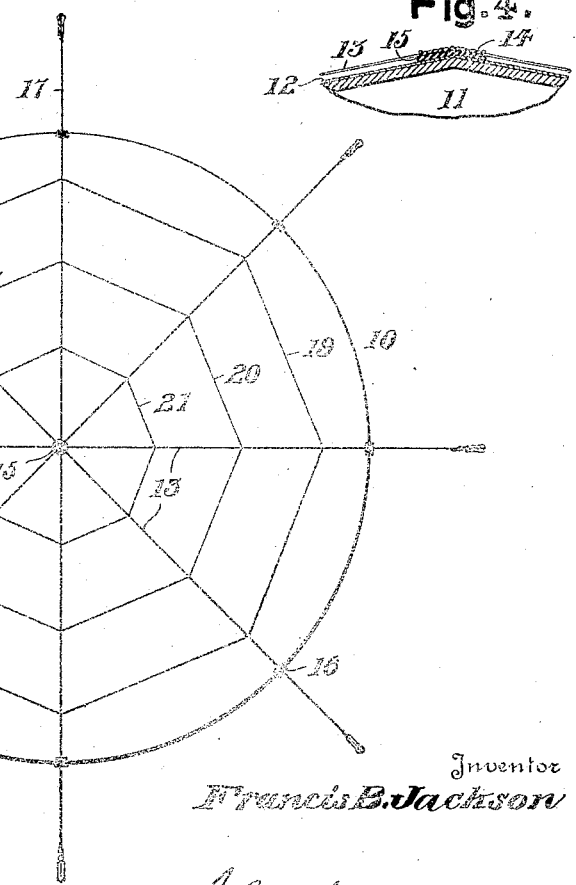
Inventor
Francis B. Jackson
By H. M. Wilson
Attorney

UNITED STATES PATENT OFFICE.

FRANCIS B. JACKSON, OF TULSA, OKLAHOMA.

LIGHTNING-PROTECTIVE ATTACHMENT FOR OIL-TANKS AND OTHER STRUCTURES.

1,251,037.     Specification of Letters Patent.     Patented Dec. 25, 1917.

Application filed August 5, 1915. Serial No. 43,886.

*To all whom it may concern:*

Be it known that I, FRANCIS B. JACKSON, a citizen of the United States of America, residing at Tulsa, in the county of Tulsa and State of Oklahoma, have invented certain new and useful Improvements in Lightning-Protective Attachments for Oil-Tanks and other Structures, of which the following is a specification.

This invention relates to certain new and useful improvements in protecting oil tanks and other structures from damage by lightning.

An object of the present invention is to provide a substantial wire web covering for oil tanks and other structures, which will completely protect the tank and other structures, from electric currents existing in the air.

A further object of the invention is to provide a lightning protective arrangement of wires in which the different wires forming the web meet in the center of the protected structure, at a point located above the same, while the lower ends thereof are connected to ground-supported stakes, so that the current in the wires, tanks, or other structure, may receive or discharge a sufficient amount of electricity from either the ground or air to neutralize the two opposite charges.

With these general objects in view and others that will appear as the nature of the invention is better understood, the same consists of the novel combination and arrangement of parts hereinafter fully described, illustrated in the accompanying drawing and then claimed.

In the drawing forming a part of this application and in which like designating characters refer to corresponding parts throughout the several views:—

Figure 1 is a side elevational view of a building structure provided with the present wiring system.

Fig. 2 is a top plan view thereof.

Fig. 3 is an enlarged plan view of the structure, illustrating the connections between the several wire units, and, Fig. 4 is a detailed sectional view of a portion of the structure roof and insulating block shown in Fig. 3.

While the present invention is adaptable for buildings of any construction, the same aims to provide a lightning protecting arrangement of wires, more especially for oil tanks of comparatively large sizes. By the arrangement of the wires as disclosed in the present invention, the tank or structure is wholly protected from lightning by reason of the fact that according to theory, the electricity in the earth or ground is of negative polarity and the electricity in the air is of positive polarity, therefore, the positive electricity which accumulates in the air is first absorbed or taken up by the protecting wires and is conducted to the ground, being neutralized by the negative charge.

The electricity of positive polarity in the air will not accumulate in sufficient quantities to cause any sudden electrical discharge, which would ignite an inflammable substance, such as oil or gas.

The present showing is a preferred form of construction and includes a tank 10 preferably cylindrical in cross-section and as shown in detail in Fig. 4, is constructed of an inner lining 11 of wood or similar material upon which is placed a plurality of metal shingles or plates 12 that completely cover the same. If desired, the tank may be constructed of metal to suit certain conditions.

The protecting wiring arrangement preferably includes eight wires or bars 13, meeting at a common point at the center of the tank which is protected by an insulator 15 so that these wires do not touch the center of the tank as disclosed, in Fig. 1 and are twisted as at 14 as shown in Fig. 3, to be joined together in any suitable manner. The wires 13 continue downwardly at 17 over suitable insulators 16 arranged around the edge of the tank, and constitute substantial guy wires as shown in Fig. 1 and are connected at their lower ends to ground-supported stakes 18. A webbing of wires 19, 20 and 21 is connected at its ends to the conducting wires 13, and substantially covers the roof of the tank 10 so that the tank will be better protected for the purpose intended.

It will therefore be seen that the tank will be well protected by the number of conducting wires 13 and that the lightning will be prevented from causing destruction in a manner as before described.

Reference numeral 23 represents a ventilator stack that is attached to the hatch on the tank. This stack is covered with gauze wire at the upper end in order to protect the tank in case the gas escaping therefrom is in any manner ignited, the wire gauze preventing the flame from burning beneath the same.

While the form of the invention herein shown and described is what is believed to be the preferred embodiment thereof, it is nevertheless to be understood that minor changes may be made in the form, proportion and details of construction without departing from the spirit and the scope of the invention as claimed.

What I claim as new is:—

A lightning protective attachment for metallic tanks comprising in combination, a flat insulator plate resting centrally upon the roof of the tank insulator blocks secured at spaced intervals to and around the top edge of the tank and unconnected with the flat insulator plate, a plurality of radiating conductor wires connected together and resting upon the upper face of said insulator plate at their meeting ends, said wires being extended over the roof of the tank and resting upon the insulator blocks and being further extended slantingly downward from the insulator blocks to the ground, grounding stakes attached to the free ends of said wires and driven into the ground to draw the said wires taut and thus hold the same out of electrical contact with the roof of the tank, and a plurality of cross-wires connected to and extending between said conductor wires, said cross-wires being positioned over the roof of the tank and held out of electrical contact therewith.

In testimony whereof I affix my signature.

FRANCIS B. JACKSON.

Copies of this patent may be obtained for five cents each, by addressing the "Commissioner of Patents, Washington, D. C."